(12) United States Patent
Chen et al.

(10) Patent No.: US 10,108,458 B2
(45) Date of Patent: Oct. 23, 2018

(54) SYSTEM AND METHOD FOR SCHEDULING JOBS IN DISTRIBUTED DATACENTERS

(71) Applicants: HUAWEI TECHNOLOGIES CANADA CO., LTD., Kanata (CA); THE GOVERNING COUNCIL OF THE UNIVERSITY OF TORONTO, Toronto (CA)

(72) Inventors: Li Chen, Toronto (CA); Shuhao Liu, Toronto (CA); Baochun Li, Toronto (CA); Jin Chen, Thornhill (CA); Chong Chen, Richmond Hill (CA)

(73) Assignees: HUAWEI TECHNOLOGIES CANADA CO., LTD., Kanata, Ontario (CA); THE GOVERNING COUNCIL OF THE UNIVERSITY OF TORONTO, Toronto, Ontario (CA)

(*) Notice: Subject to any disclaimer, the term of this patent is extended or adjusted under 35 U.S.C. 154(b) by 2 days.

(21) Appl. No.: 15/444,797

(22) Filed: Feb. 28, 2017

(65) Prior Publication Data
US 2018/0246765 A1     Aug. 30, 2018

(51) Int. Cl.
*G06F 9/50* (2006.01)
*G06F 9/48* (2006.01)

(52) U.S. Cl.
CPC .......... *G06F 9/5038* (2013.01); *G06F 9/4887* (2013.01); *G06F 9/5083* (2013.01)

(58) Field of Classification Search
CPC .................................................. G06F 9/5038
See application file for complete search history.

(56) References Cited

U.S. PATENT DOCUMENTS

| | | | | |
|---|---|---|---|---|
| 2006/0218551 | A1* | 9/2006 | Berstis .................. | G06F 9/4881 718/102 |
| 2017/0357534 | A1* | 12/2017 | Gupta ................... | G06F 9/4881 |

OTHER PUBLICATIONS

Qifan Pu et al., Low Latency Analytics of Geo-distributed Data in the Wide Area, SIGCOMM 15, Aug. 2015.
Zhiming Hu et al., Flutter: Scheduling Tasks Closer to Data Across Geo-Distributed Datacenters, IEEE, 2016.
Shiming Hu et al., Flutter: Scheduling Tasks Closer to Data Across Geo-Distributed Datacenters, IEEE, 2016.

* cited by examiner

*Primary Examiner* — Charlie Sun
(74) *Attorney, Agent, or Firm* — Norton Rose Fulbright Canada LLP

(57) ABSTRACT

Methods and systems for scheduling jobs in a distributed computing environment include: obtaining a set of task identifiers, each task identifier identifying a corresponding data processing task included in one of a plurality of jobs to be scheduled for execution at one of a plurality of data processing locations; and selecting and scheduling a data processing task of the identified job having a longest optimal completion time to the data processing location corresponding to the optimal completion time of the selected data processing task.

27 Claims, 12 Drawing Sheets

SYSTEM AND METHOD FOR SCHEDULING JOBS IN DISTRIBUTED DATACENTERS

FIELD

This disclosure relates to the field of distributed datacenters, and more particularly, to systems, devices, methods and computer-readable media for scheduling jobs in distributed datacenters.

BACKGROUND

In computing environments such as cloud computing or other distributed computing platforms, data and computational resources may be located at different networked or geo-distributed locations.

As the amount of data and the number of jobs scale, it can be a challenge to effectively distribute jobs across datacenters.

SUMMARY

In some situations, some embodiments of the present disclosure may consider tasks across multiple jobs when scheduling jobs for execution in a distributed computing environment.

In accordance with one aspect of the present disclosure, there is provided method for scheduling jobs in a distributed computing environment. The method includes: obtaining a set of task identifiers, each task identifier identifying a corresponding data processing task included in one of a plurality of jobs to be scheduled for execution at one of a plurality of data processing locations; from the jobs having unscheduled data processing tasks, selecting a job having a longest job completion time based on a shortest task completion time for the data processing tasks included in the selected job; selecting, from unscheduled data processing tasks for the selected job, a data processing task having a longest task completion time based on shortest task completion times for the unscheduled data processing tasks for the selected job; and scheduling the selected data processing task for execution at the data processing location of the plurality of data processing locations corresponding to the selected data processing task's shortest completion time and having available processing resources.

In some embodiments, the method includes: adjusting the completion times of all other unscheduled data processing tasks included in the selected job to have a completion time equal to the maximum of: the optimal completion time of the selected data processing task, and the completion time of the respective unscheduled data processing task.

In any of the previous embodiments, the method can include: until each data processing task identified in the set of task identifiers has been scheduled, repeating: updating the available processing resources to identify the resources to be consumed by the previously scheduled data processing task as unavailable; selecting the job of the set of jobs having unscheduled tasks and having the longest job completion time based on the shortest task completion time for the data processing tasks included in the selected job; selecting, from the unscheduled tasks for the selected job, the data processing task having the longest task completion time based on shortest task completion times for the unscheduled data processing tasks for the selected job; and scheduling the selected data processing task at the data processing location corresponding to the selected data processing task's shortest completion time.

In any of the previous embodiments, the method can include: for each data processing task identified in the set of task identifiers: determining input data transfer times to transfer input data for the data processing task to each of the plurality of data processing locations having available processing resources; and for each of the plurality of data processing locations having available processing resources, determining a completion time for the data processing task based on the corresponding input data transfer time.

In any of the previous embodiments, determining the input data transfer times for a single data processing task identified in the set of task identifiers can include: identifying a size and location of each input data for the single data processing task; determining a communication bandwidth between each input data location and each of the data processing locations; and for each of the data processing locations: determining the transfer time for each of the input data to the data processing location based on the size of the input data and the communication input data location and the data processing location; and selecting, from the transfer times for each of the input data to the data processing location, a largest transfer time as the input data transfer time for the single data processing task at the data processing location.

In any of the previous embodiments, the method can include: for each of the data processing tasks identified in the set of task identifiers, determining an execution time for the data processing task; and for each of the plurality of data processing locations having available processing resources, determining the completion time for the data processing task at the data processing location based on the corresponding input data transfer time and the corresponding execution time.

In any of the previous embodiments, identifying the execution time for the data processing task can include: identifying a type of the data processing task; based on a database of execution data for types of data processing tasks, determining the execution time for the data processing task based on the identified type, and a size of the input data for the data processing task.

In any of the previous embodiments, the method can include: populating one or more data structures representing completion time objectives and constraints based on the completion times for each of the data processing tasks, data processing location assignments parameters, and the available resources; wherein selecting the job having the longest optimal completion time includes solving a linear programming problem defined by the matrices.

In any of the previous embodiments, obtaining the set of task identifiers can include: receiving job execution requests until a scheduling trigger is detected; and upon detection of the scheduling trigger, identifying the set of data processing tasks to be scheduled from the job execution requests.

In any of the previous embodiments, the scheduling trigger can be detected when a defined time period has elapsed, or when a number of received jobs execution requests meets a defined threshold.

In any of the previous embodiments, the data processing tasks identified in the set of task identifiers can be executed in parallel.

In any of the previous embodiments, selecting the job having the longest job completion time can be based on the shortest task completion times at data processing locations having available resources; and selecting the data processing task having the longest task completion time can be based on the shortest task completion times for the unscheduled data processing tasks for the selected job at data processing locations having available resources.

In accordance with another aspect of the present disclosure there is provided a system comprising: at least one processor for scheduling jobs in a distributed computing environment. The at least one processor is configured for: obtaining a set of task identifiers, each task identifier identifying a corresponding data processing task included in one of a plurality of jobs to be scheduled for execution at one of a plurality of data processing locations; from the jobs having unscheduled data processing tasks, selecting a job having a longest job completion time based on a shortest task completion time for the data processing tasks included in the selected job; selecting, from unscheduled data processing tasks for the selected job, a data processing task having a longest task completion time based on shortest task completion times for the unscheduled data processing tasks for the selected job; and scheduling the selected data processing task for execution at the data processing location of the plurality of data processing locations corresponding to the selected data processing task's shortest completion time and having available processing resources.

In some embodiments, the at least one processor is configured for: adjusting the completion times of all other unscheduled data processing tasks included in the selected job to have a completion time equal to the maximum of: the optimal completion time of the selected data processing task, and the completion time of the respective unscheduled data processing task.

In any of the previous embodiments, the at least one processor is configured for: until each data processing task identified in the set of task identifiers has been scheduled, repeating: updating the available processing resources to identify the resources to be consumed by the previously scheduled data processing task as unavailable; selecting the job of the set of jobs having unscheduled tasks and having the longest job completion time based on the shortest task completion time for the data processing tasks included in the selected job; selecting, from the unscheduled tasks for the selected job, the data processing task having the longest task completion time based on shortest task completion times for the unscheduled data processing tasks for the selected job; and scheduling the selected data processing task at the data processing location corresponding to the selected data processing task's shortest completion time.

In any of the previous embodiments, the at least one processor can be configured for: for each data processing task identified in the set of task identifiers: determining input data transfer times to transfer input data for the data processing task to each of the plurality of data processing locations having available processing resources; and for each of the plurality of data processing locations having available processing resources, determining a completion time for the data processing task based on the corresponding input data transfer time.

In any of the previous embodiments, determining the input data transfer times for a single data processing task identified in the set of task identifiers can include: identifying a size and location of each input data for the single data processing task; determining a communication bandwidth between each input data location and each of the data processing locations; and for each of the data processing locations: determining the transfer time for each of the input data to the data processing location based on the size of the input data and the communication input data location and the data processing location; and selecting, from the transfer times for each of the input data to the data processing location, a largest transfer time as the input data transfer time for the single data processing task at the data processing location.

In any of the previous embodiments, the at least one processor can be configured for: for each of the data processing tasks identified in the set of task identifiers, determining an execution time for the data processing task; and for each of the plurality of data processing locations having available processing resources, determining the completion time for the data processing task at the data processing location based on a corresponding input data transfer time and the corresponding execution time.

In any of the previous embodiments, determining the input data transfer times for a single data processing task identified in the set of task identifiers can include: identifying a size and location of each input data for the single data processing task; determining a communication bandwidth between each input data location and each of the data processing locations; and for each of the data processing locations: determining the transfer time for each of the input data to the data processing location based on the size of the input data and the communication input data location and the data processing location; and selecting, from the transfer times for each of the input data to the data processing location, a largest transfer time as the input data transfer time for the single data processing task at the data processing location.

In any of the previous embodiments, the at least one processor can be configured for: for each of the data processing tasks identified in the set of task identifiers, determining an execution time for the data processing task; and for each of the plurality of data processing locations having available processing resources, determining the completion time for the data processing task at the data processing location based on the a corresponding input data transfer time and the corresponding execution time.

In any of the previous embodiments, identifying the execution time for the data processing task can include: identifying a type of the data processing task; based on a database of execution data for types of data processing tasks, determining the execution time for the data processing task based on the identified type, and a size of the input data for the data processing task.

In any of the previous embodiments, the at least one processor can be configured for: populating one or more data structures representing completion time objectives and constraints based on the completion times for each of the data processing tasks, data processing location assignments parameters, and the available resources; wherein selecting the job having the longest optimal completion time includes solving a linear programming problem defined by the matrices.

In any of the previous embodiments, obtaining the set of task identifiers can include: receiving job execution requests until a scheduling trigger is detected; and upon detection of the scheduling trigger, identifying the set of data processing tasks to be scheduled from the job execution requests.

In any of the previous embodiments, scheduling trigger can be detected when a defined time period has elapsed, or when a number of received jobs execution requests meets a defined threshold.

In any of the previous embodiments, the data processing tasks identified in the set of task identifiers can be executed in parallel.

In any of the previous embodiments, selecting the job having the longest job completion time can be based on the shortest task completion times at data processing locations having available resources; and selecting the data processing task having the longest task completion time can be based on the shortest task completion times for the unscheduled data processing tasks for the selected job at data processing locations having available resources.

In accordance with another aspect of the present disclosure there is provided a non-transitory, computer-readable medium or media having stored thereon computer-readable instructions. The instructions, which when executed by at least one processor, configure the at least one processor for: obtaining a set of task identifiers, each task identifier identifying a corresponding data processing task included in one of a plurality of jobs to be scheduled for execution at one of a plurality of data processing locations; from the jobs having unassigned data processing tasks, selecting a job having a longest job completion time based on a shortest task completion time for the data processing tasks included in the selected job; selecting, from unscheduled data processing tasks for the selected job, a data processing task having a longest task completion time based on shortest task completion times for the unscheduled data processing tasks for the selected job; and scheduling the selected data processing task for execution at the data processing location of the plurality of data processing locations corresponding to the selected data processing task's shortest completion time and having available processing resources.

In some embodiments, the computer-readable instructions can configure the at least one processor for: adjusting the completion times of all other unscheduled data processing tasks included in the selected job to have a completion time equal to the maximum of: the optimal completion time of the selected data processing task, and the completion time of the respective unscheduled data processing task.

In any of the previous embodiments, the computer-readable instructions can configure the at least one processor for: until each data processing task identified in the set of task identifiers has been scheduled, repeating: updating the available processing resources to identify the resources to be consumed by the previously scheduled data processing task as unavailable; selecting the job of the set of jobs having unscheduled tasks and having the longest job completion time based on the shortest task completion time for the data processing tasks included in the selected job; selecting, from the unscheduled tasks for the selected job, the data processing task having the longest task completion time based on shortest task completion times for the unscheduled data processing tasks for the selected job; and scheduling the selected data processing task at the data processing location corresponding to the selected data processing task's shortest completion time.

In any of the previous embodiments, the computer-readable instructions can configure the at least one processor for: for each data processing task identified in the set of task identifiers: determining input data transfer times to transfer input data for the data processing task to each of the plurality of data processing locations having available processing resources; and for each of the plurality of data processing locations having available processing resources, determining a completion time for the data processing task based on the corresponding input data transfer time.

In any of the previous embodiments, determining the input data transfer times for a single data processing task identified in the set of task identifiers can include: identifying a size and location of each input data for the single data processing task; determining a communication bandwidth between each input data location and each of the data processing locations; and for each of the data processing locations: determining the transfer time for each of the input data to the data processing location based on the size of the input data and the communication input data location and the data processing location; and selecting, from the transfer times for each of the input data to the data processing location, a largest transfer time as the input data transfer time for the single data processing task at the data processing location.

In any of the previous embodiments, the computer-readable instructions can configure the at least one processor for: for each of the data processing tasks identified in the set of task identifiers, determining an execution time for the data processing task; and for each of the plurality of data processing locations having available processing resources, determining the completion time for the data processing task at the data processing location based on a corresponding input data transfer time and the corresponding execution time.

In any of the previous embodiments, determining the input data transfer times for a single data processing task identified in the set of task identifiers can include: identifying a size and location of each input data for the single data processing task; determining a communication bandwidth between each input data location and each of the data processing locations; and for each of the data processing locations: determining the transfer time for each of the input data to the data processing location based on the size of the input data and the communication input data location and the data processing location; and selecting, from the transfer times for each of the input data to the data processing location, a largest transfer time as the input data transfer time for the single data processing task at the data processing location.

In any of the previous embodiments, the computer-readable instructions can configure the at least one processor for: for each of the data processing tasks identified in the set of task identifiers, determining an execution time for the data processing task; and for each of the plurality of data processing locations having available processing resources, determining the completion time for the data processing task at the data processing location based on the a corresponding input data transfer time and the corresponding execution time.

In any of the previous embodiments, identifying the execution time for the data processing task can include: identifying a type of the data processing task; based on a database of execution data for types of data processing tasks, determining the execution time for the data processing task based on the identified type, and a size of the input data for the data processing task.

In any of the previous embodiments, the computer-readable instructions can configure the at least one processor for: populating one or more data structures representing completion time objectives and constraints based on the completion times for each of the data processing tasks, data processing location assignments parameters, and the available resources; wherein selecting the job having the longest optimal completion time includes solving a linear programming problem defined by the matrices.

In any of the previous embodiments, obtaining the set of task identifiers can include: receiving job execution requests until a scheduling trigger is detected; and upon detection of the scheduling trigger, identifying the set of data processing tasks to be scheduled from the job execution requests.

In any of the previous embodiments, scheduling trigger can be detected when a defined time period has elapsed, or when a number of received jobs execution requests meets a defined threshold.

In any of the previous embodiments, the data processing tasks identified in the set of task identifiers can be executed in parallel.

In any of the previous embodiments, selecting the job having the longest job completion time can be based on the shortest task completion times at data processing locations having available resources; and selecting the data processing task having the longest task completion time can be based on the shortest task completion times for the unscheduled data processing tasks for the selected job at data processing locations having available resources.

Many further features and combinations thereof concerning the present improvements will appear to those skilled in the art following a reading of the instant disclosure.

These drawings depict aspects of example embodiments for illustrative purposes. Variations, alternative configurations, alternative components and modifications may be made to these example embodiments.

DETAILED DESCRIPTION

It is increasingly common for large volumes of data to be generated and processed in a distributed fashion at multiple datacenters spread across a network and/or geographically around the world.

A data analytic job can often be separated into tens to thousands of data processing tasks. Some tasks may be dependent on the results of previous tasks in the job. In some approaches, a job can be divided into a number of consecutive computation stages, each of which includes a number of data processing tasks which can be executed in parallel. To start a new computation stage, intermediate data from the preceding stage may need to be fetched from another location, which may initiate multiple network flows.

When input data is located across multiple datacenters, one approach is to gather all the data for a single job to be processed locally within a single datacenter. In some instances, transferring large amounts of data between datacenters may be slow and inefficient because bandwidth on inter-datacenter links may be limited.

In some approaches, better performance may be achieved if tasks in a job are distributed across datacenters to be located closer to the data being processed. Different task assignment architectures can results in different data flow patterns, and may ultimately affect job completion times and throughput.

In one task scheduling architecture, all of the tasks of an individual job may be considered to determine an optimal task assignment for that particular job. However, because multiple jobs are competing for limited resources, optimizing the performance for a single job may assign resources to the detriment of other jobs waiting to be executed.

In some instances, task scheduling architectures which consider tasks across multiple jobs may result in increased fairness in the distribution of resources, and may reduce execution times for concurrently executing jobs. In some instances, this may improve the overall throughput of the system.

Figure 1:
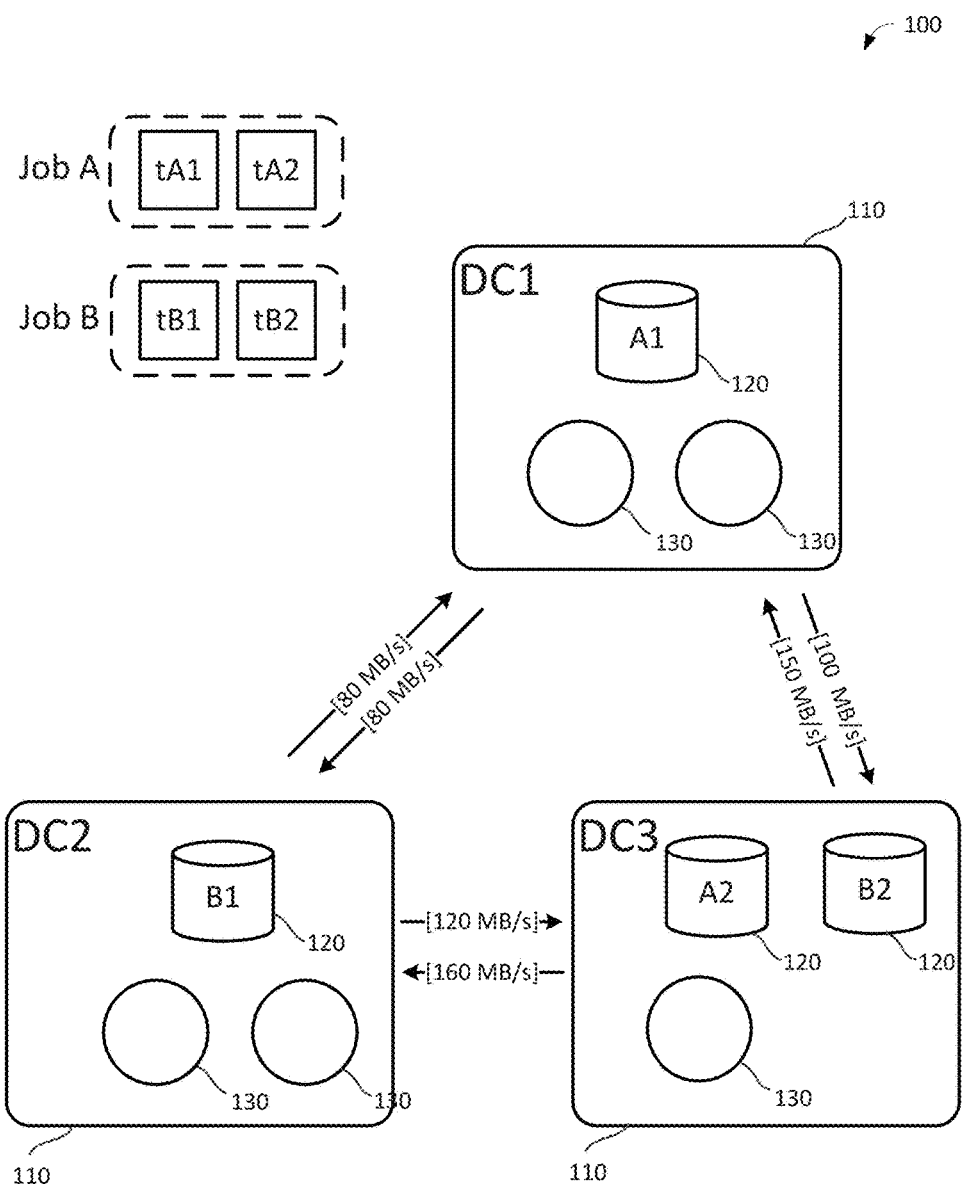
FIG. 1 is a diagram showing aspects of an example computing environment and task assignment scenario.

FIG. 1 illustrates an example distributed computing environment 100 including three datacenters 110 labelled DC1, DC2, and DC3. Each datacenter 110 includes data storage device(s) 120 which contain input data A1, A2, B1, or B2 as labelled. Each datacenter 110 includes a number of processing slots 130 with each slot representing a set of available computing resource(s) which can accommodate a single task assignment. The arrows represent the available communication bandwidth between the datacenters 110 in MB/s.

In this example scenario, two jobs, Job A and Job B, have been received for scheduling. Job A includes two tasks tA1 and tA2, each of which require input data A1 and A2. Job B includes two tasks tB1 and tB2, each of which require input data B1 and B2. For Job A, both of its tasks, tA1 and tA2, require 100 MB of data from input data A1 stored in DC1, and 200 MB of data from A2 located at DC3. For Job B, the amounts of data to be read by task tB1 from data B1 in DC2 and B2 in DC3 are both 200 MB; and task tB2 needs to read 200 MB of data from B1 and 300 MB from B2.

Figure 2:
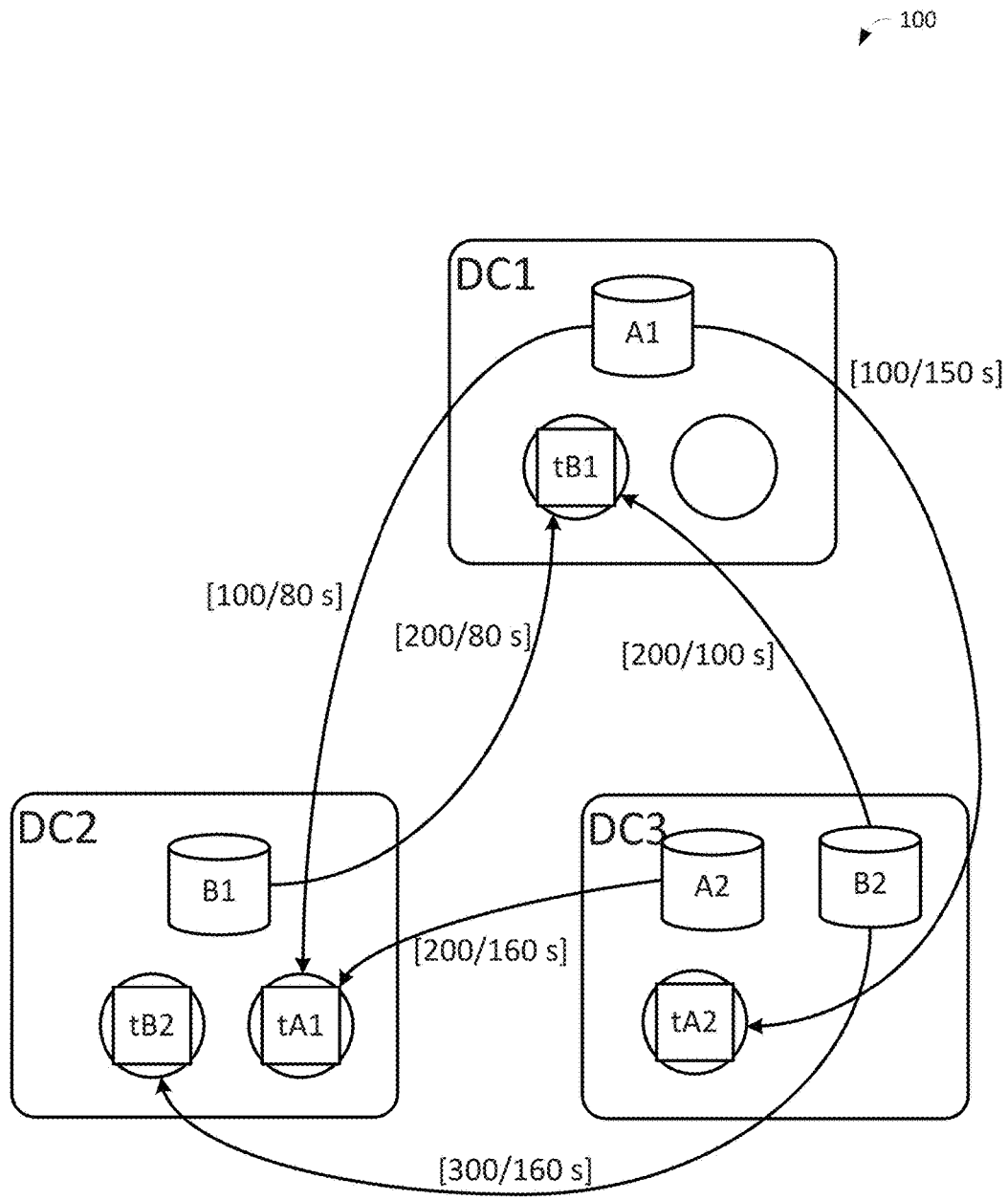
FIG. 2 is a diagram showing an example task assignment for the computing environment of FIG. 1.

FIG. 2 shows an example task assignment for the example computing environment 100 and scenario illustrated in FIG. 1. This example assignment was scheduled by a scheduler configured to optimize task assignments on a job-by-job basis. The arrows illustrate the transfer times for each input data in seconds (input data size in MB/bandwidth in MB per second).

To optimize the assignment of Job A, task tA2 is assigned to the only available computing slot in DC3, and tA1 is assigned to DC2, which when considering only data transfer times results in a job completion time of max {100/80, 200/160, 100/150}=1.25 seconds. Then, the scheduler continues to optimize the assignment of Job B. DC1 and DC2 are selected to distribute tasks tB1 and tB2, respectively, resulting in the completion time for Job B of max {200/80, 200/100, 200/160}=2.5 seconds. This task placement may not be optimal when considering the performance of the jobs jointly.

Figure 3:
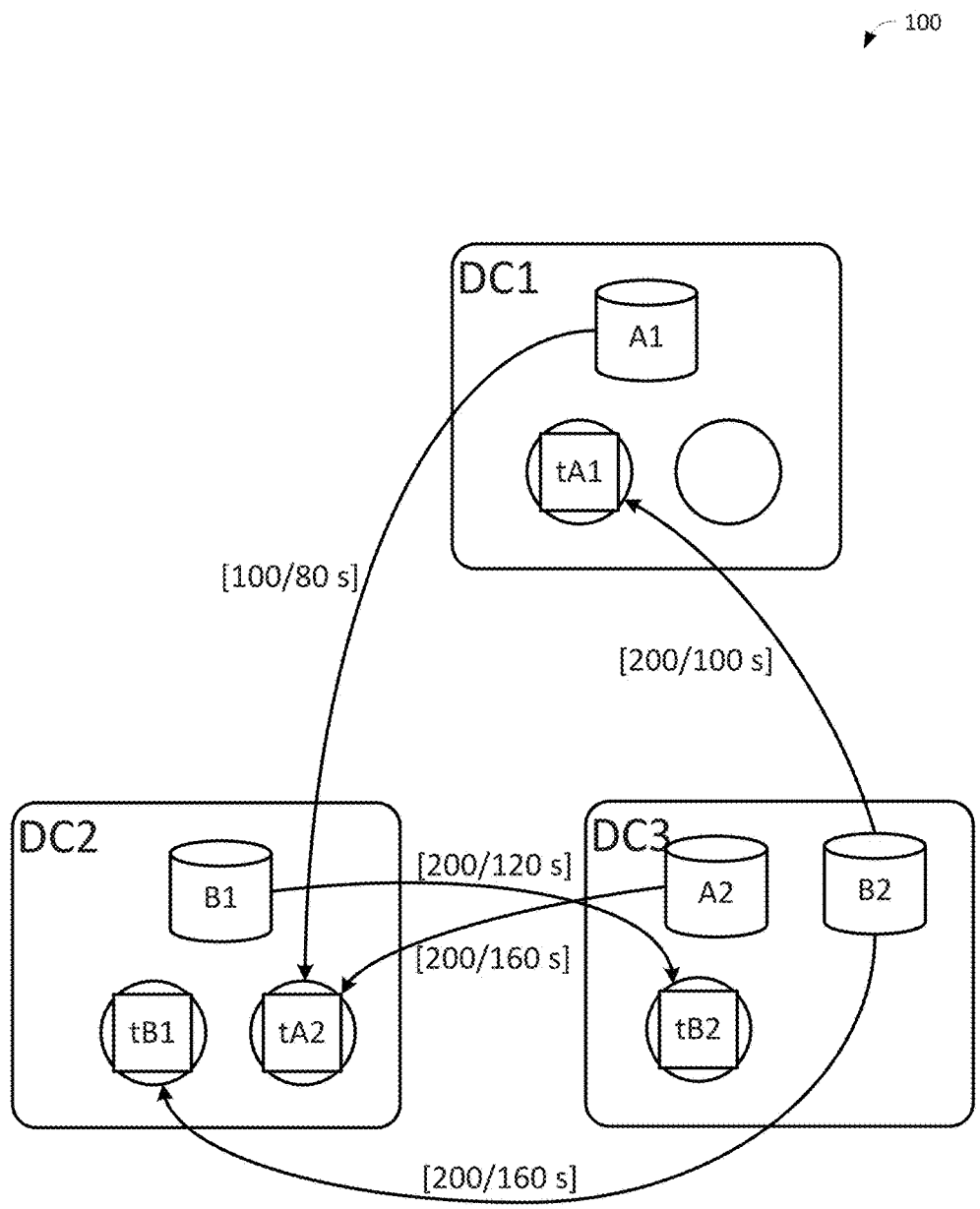
FIG. 3 is a diagram showing another example task assignment for the computing environment of FIG. 1.

FIG. 3 shows another example task assignment for the example computing environment 100 and scenario illustrated in FIG. 1. This example assignment was scheduled by a scheduler configured to consider task assignments across different jobs. In this assignment, task tB2 is assigned to the computing slot in DC3, which avoids the transfer of 300 MB of data from dataset B2. Task tB1 is assigned to DC2 rather than DC1, which takes advantage the high bandwidth of the DC3-DC2 link. In this assignment, the completion times of Job A and Job B are max {200/100, 100/80, 200/160}=2 seconds, and max {200/160, 200/120}=1.67 seconds, respectively. Compared to the independent assignment in FIG. 2 where the worst completion time across both jobs is 2.5 seconds, the assignment in FIG. 3 results in a worst completion time of 2 seconds.

Aspects of embodiments described herein may, in some instances, provide a task scheduler which considers task assignments across multiple jobs.

Figure 4:
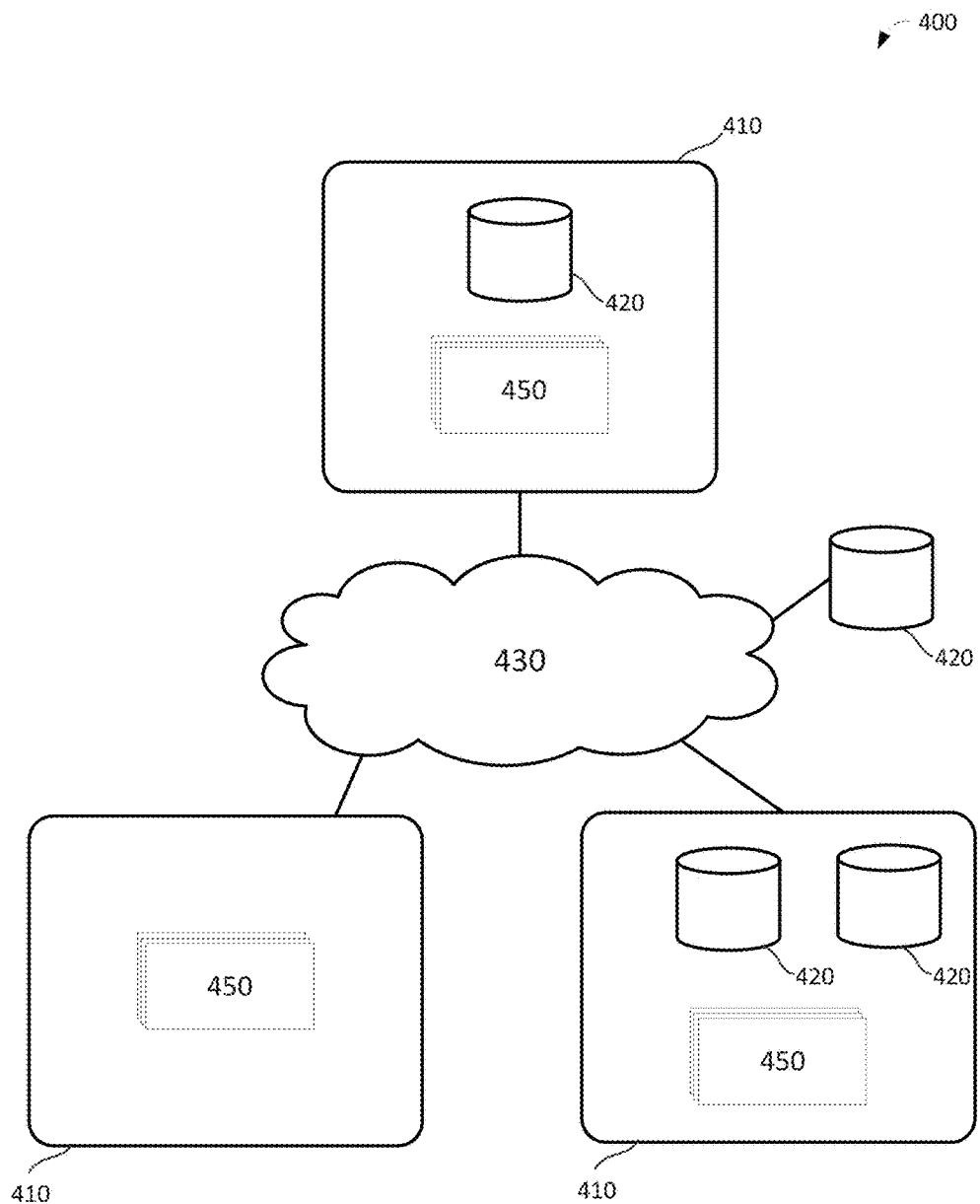
FIG. 4 is a diagram showing aspects of an example computing environment.

FIG. 4 is a schematic showing aspects of an example distributed computing environment 400 to which aspects of the present disclosure may be applied. In some embodiments, the distributed computing environment 400 can include any combination of hardware and software components, and may be referred to as a system. For example, a distributed computing environment 400 may include a combination of computing devices, processors, networks, memories, storage devices, network devices, power sources, license servers (e.g., software license servers), swap space, and the like. In some embodiments, the computing environment 400 may be a heterogeneous or a homogenous environment, and may have different or similar hardware components running different or similar operating systems.

In some embodiments, the distributed computing environment 400 may be a computing system including one or more processors in a single device or split across any number of devices. These processors can be configured to manage the resources 450 and/or schedule tasks in the computing system. The computing system can be configured as a distributed resource management (DRM) system. In some embodiments, the DRM system is an infrastructure middleware which can run on top of a distributed environment. The distributed computing environment 400 can include different kinds of hardware and software. The distributed computing environment 400 includes a number of data processing locations 410. A data processing location 410 can include one or more devices having computing resources 450. In some embodiments, a data processing location 410 can be a single device physically or logically, such as an individual computer or server. In some embodiments, a data processing location 410 can include multiple devices such as a computing system, mainframe or datacenter.

The distributed computing environment 400 can include one or more resources 450 which can be utilized to perform data processing tasks. Resources 450 can include, but are not limited to, processors (e.g. central processing units, graphics processing units, processing units or cores, integrated circuits, field-programmable gate arrays, any other computational devices, and the like), memories, network resources (ports, bandwidth allocations, etc.), software licenses, data storage devices, and any other hardware or software component, or combination thereof which can be assigned to tasks/jobs in a distributed computing environment. These resources 450 can be at any number of data processing locations 410.

Some resources 450 may be physically or logically associated with a single device, and other resources 450 may be shared resources which may be utilized by multiple devices in the distributed computing environment 400. In some embodiments, resources 150 in the computing environment 400 can have or otherwise be associated with one or more attributes or characteristics. In some embodiments, attributes can include resource type or class, resource state/status, resource location, resource identifier/name, resource value, resource capacity, resource capabilities, or any other resource information that can be used as criteria for selecting or identifying a suitable resource.

The distributed computing environment 400 can include one or more data storage devices 420 located at data processing locations 410 or elsewhere in the environment 400. The data storage devices 420 may store input, output and/or intermediate data for one or more tasks or jobs. Data may be in the form of datasets, databases, files, or any suitable format.

The data processing locations 410, resources 450, and data storage devices 420 may be connected by one or more data networks 430. The data networks 430 can include direct communication links, physical networks, logical networks, wired networks and/or wireless networks. These networks may include any number of network devices, communication interfaces, or other components for data communication between elements of the distributing computing environment. In some embodiments, data networks 430 can include communication connections between different systems or devices, and/or interconnections within a device or system (e.g. within a datacenter, within a rack, within a backplane, etc.). In some embodiments, aspects of the networks 430 themselves can be resources. For example, physical or logical connections/ports/addresses, communication bandwidths, protocols, etc. In some embodiments, various elements of the data processing locations 410 or other elements of the environment include communication interfaces and/or other suitable hardware and/or software components for communicating data across the network(s) 430.

In some embodiments, processors and/or other computer elements at the data processing locations 410 and/or elsewhere in the distributed computing environment can be configured to operate one or more distributed resource management (DRM) agents or other hardware and/or software elements for monitoring and reporting resource capabilities and/or availabilities, file sizes, network bandwidths, and/or any other information for the job/task schedulers described herein.

In some embodiments, processors and/or other computer elements in the system may be configured to operate at least portions of a DRM system including, for example, DRM agents, master daemons, data processing engines, job managers, directed acyclic graph schedulers, task schedulers, resources managers and/or any other DRM component or portion thereof. These DRM components may be software components, hardware components, or any combination thereof. In some embodiments, the DRM components may be implemented by machine-readable instructions being executed on one or more processors.

Aspects of the present disclosure may be applied to various DRM systems such as the IBM™ Platform Load Sharing Facility (LSF), Apache™ Hadoop™, YARN (Yet Another Resource Negotiator), Apache™ Spark™, PBS (Portable Batch Scheduler), OpenStack™, Huawei™ FusionSphere, FusionCube and FusionInsight.

Figure 5:
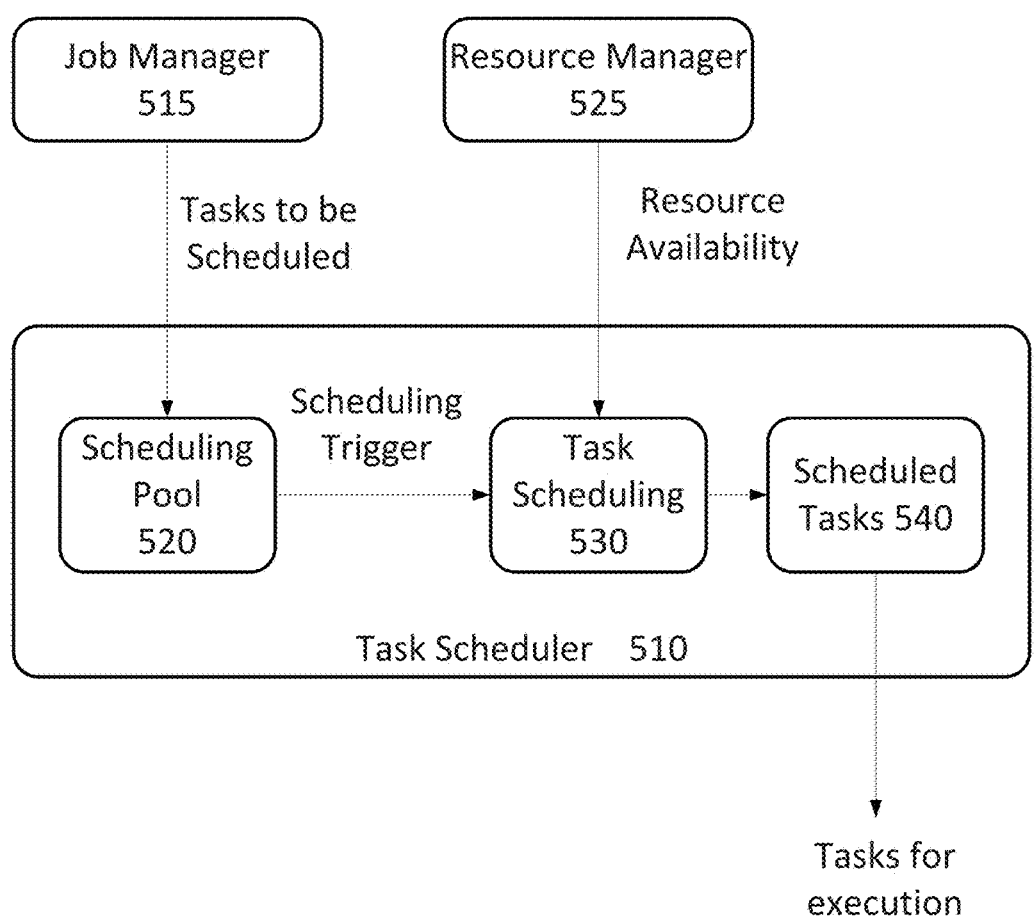
FIG. 5 is a schematic showing aspects of an example system and process for scheduling jobs.

FIG. 5 illustrates a schematic showing aspects of an example system 500 and process 501 for scheduling jobs in a distributed computing environment.

Jobs can refer to any process, service, or any other computing operation or set of operations to be run on a computing system. For example, jobs may include batch jobs (e.g., high performance computing (HPC) batch jobs), Message Passing Interface (MPI) processes, serial and/or parallel batch tasks, real time analytics, elastic applications (e.g., MapReduce), long running services, virtual machines, containers, etc.

In some instances, jobs include a number of tasks, or smaller operations which are to be completed in order to complete the job. In some embodiments, some tasks may be dependent on other tasks because they may utilize the output of a previous task as an input. In some embodiments, some tasks may be independent of and may be executed in parallel with others.

In some embodiments, the system 500 includes a task scheduler 510, a job manager 515, and a resource manager 525. In some embodiments, the functions performed by these DRM components can be executed on different processors, devices, and/or data processing locations. In some embodiments, some or all the functions performed by these DRM components can be executed on the same processors, devices and/or data processing locations as other DRM components. In some embodiments, there may be no separation between some or all aspects of the job manager, task scheduler and/or resource manager; and some or all of their functionalities may all be executed by a single data process.

The task scheduler 510 obtains a set of task identifiers identifying data processing tasks to be scheduled. In some embodiments, a task identifier may be a unique identifier assigned to a task by the DRM system. In some embodiments, the task identifier may be mapped or otherwise associated with additional task data such as a job identifier identifying a job to which the task belongs, a task function call, task parameters, inputs, outputs, task types, data dependencies and/or the like. In some embodiments, task identifiers may include or may be included in some or all of the additional task data. In some embodiments, this task data is obtained from the job manager or other element of the DRM system.

In some instances, the data processing tasks identified in the set of task identifiers can be from multiple jobs. For example, a set of data processing tasks identified by the set of task identifiers may include two tasks from Job A, and two tasks from Job B.

In some embodiments, the task scheduler 510 obtains task identifiers from a job manager 515 or other element in the DRM system. In some embodiments, a job manager 515 receives job execution requests and communicates some or all tasks from a single job to the task scheduler 510. In some embodiments, the job manager 515 may only send, for scheduling, tasks which are ready for execution, for example, if they have no outstanding data dependencies.

In some embodiments, the job manager 515 may be or may include a directed acyclic graph (DAG) scheduler. In some embodiments, the job manager 515 separates a job's tasks into stages which can be provided to the task scheduler on a stage by stage basis. In some embodiments, all tasks obtained by the task scheduler for a particular iteration of scheduling can be executed in parallel.

In some embodiments, the task scheduler 510 can store the task identifiers and/or task data in a scheduling pool 520. For example, the task identifiers and/or task data may be stored in a buffer, memory, storage device and the like in a queue or other suitable arrangement until a scheduling trigger is detected.

In some embodiments, a scheduling trigger may be detected when the number of tasks or jobs represented in the scheduling pool 520 meets a defined threshold (e.g. the number of tasks or jobs is greater than X).

In some embodiments, a scheduling trigger may be detected when a defined time period has elapsed. In some embodiments, a scheduling trigger may be detected when a defined number or percentage of resources in the system become available.

In some embodiments, a scheduling trigger may be detected when the scheduling of a previous set of tasks has been completed. In some embodiments, a scheduling trigger may be detected when the execution of a previous set of tasks has been completed.

In some embodiments, a scheduling trigger may be related to any suitable event, or any combination thereof.

Upon detection of a scheduling trigger, the task scheduler 510, in some embodiments, may identify some or all of the tasks in the scheduling pool and/or their corresponding identifiers as a set of task identifiers corresponding to tasks to be scheduled.

In some embodiments, the task scheduler 510 receives resource availability data for resources in the DRM system. This data may include static and/or runtime/dynamic resource information. In some examples, the resource availability data may include resource types, resource names, device identifiers, network addresses, resource capacities or capabilities, consumed/available resource information, resource status, resource relationships, topologies, and/or any other information associated with one or more resources.

In some embodiments, resource availability data can include a number of available processing cores, a total number of processing cores, an amount of free RAM, an up/down status of a resource, a type of processor, a processor speed, an operating system, and the like.

In some embodiments, the DRM system may include a resource manager 525 or cluster manager which receives resource availability data from different agents or other DRM components in the system which monitor and report local resource availability data. In some embodiments, the resource availability information may be obtained by the task scheduler from a resource manager 525 and/or directly from DRM components (e.g. agents) in the system.

In some embodiments, the task scheduler 510 receives or otherwise obtains network and task data such as input data sizes, input data locations, network bandwidths, and the like. Some or all of this data may be received with the task data and/or the resource data.

The task scheduler performs task scheduling operations 530 on a set of tasks to be scheduled from the scheduling pool 520. In some embodiments, the task scheduler 510 is configured to consider optimal job completion times as well as fairness in resource allocation between jobs. In some instances, a task scheduling/assignment problem can be an NP-hard integer optimization problem.

However, in some embodiments, the task scheduling processes 530 described herein may reduce the processor computations into a linear programming problem which, in some instances, may be computed efficiently.

In some embodiments, the task scheduling processes 530 assign the tasks to available resources, and the assigned tasks are scheduled for execution. In some embodiments, the scheduled task data 540 including task identifiers and their assigned data processing locations/resources are stored in a buffer or other data storage device until the instructions or other signals for executing the tasks are transmitted. In some embodiments, the signals for executing the scheduled tasks are transmitted after all tasks in the scheduling pool have been scheduled.

In some embodiments, instructions or other signals for executing the tasks are transmitted as soon as a task is scheduled.

Figure 6:
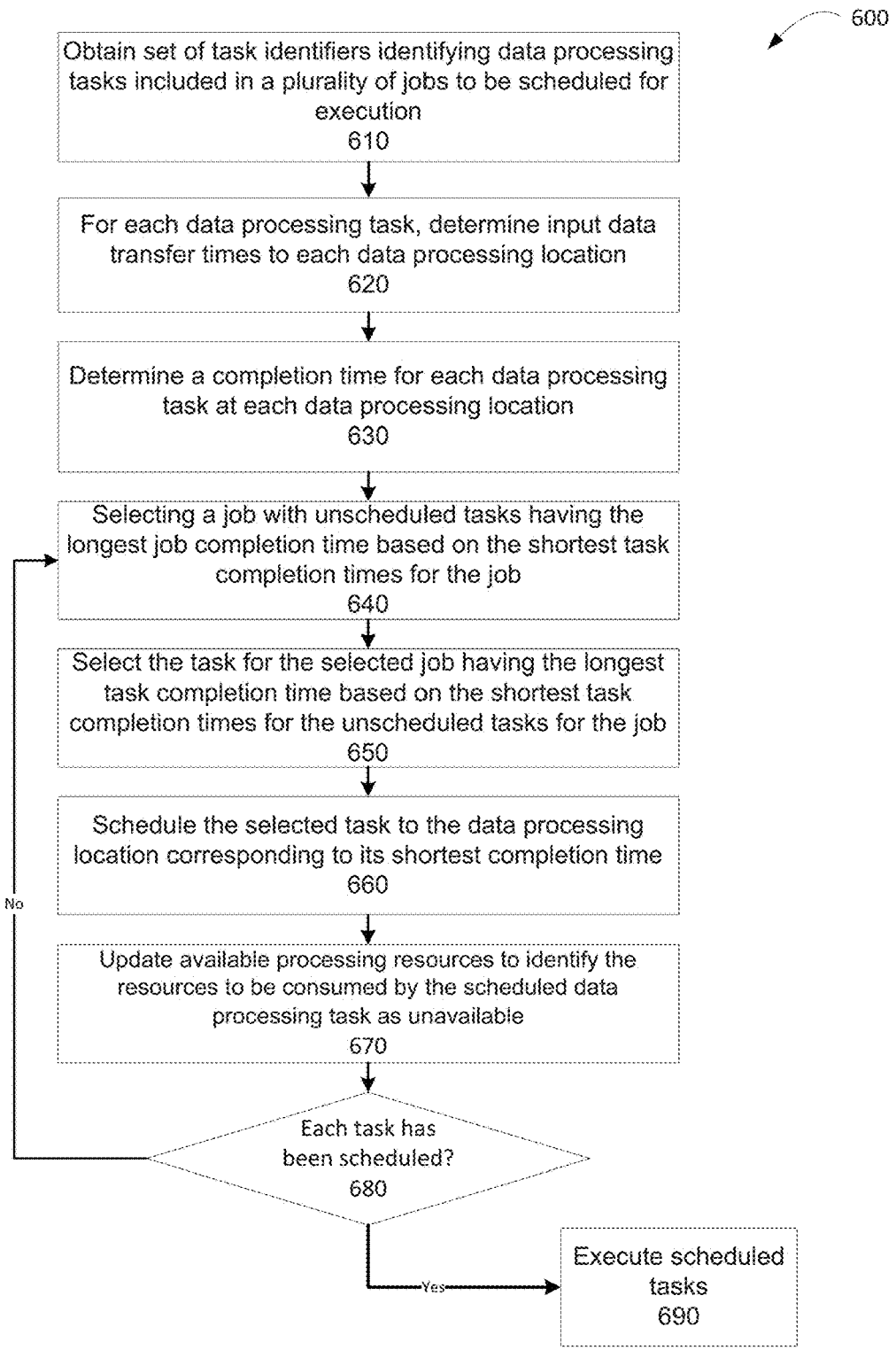
FIG. 6 is a flowchart showing aspects of an example method for scheduling jobs.

FIG. 6 is a flowchart showing aspects of an example method 600 for scheduling jobs in a distributed computing environment.

At 610, as described herein or otherwise, one or more processors in the DRM system obtain a set of task identifiers. In some embodiments, each task identifier identifies a corresponding data processing task to be scheduled for execution. The set of task identifiers may define a set of data processing tasks which are from at least two different jobs. As described herein or otherwise, data processing jobs can include one or more data processing tasks.

In some embodiments, the set of task identifiers may be grouped in a data structure such as an array or database table. In other examples, the set of task identifiers may not necessarily be stored in a separate data structure but may be referenced by links or otherwise logically grouped together in a set.

At 620, the processor(s) determines transfer times to transfer input data to each data processing location for each of the data processing tasks. In some instances, the processors may generate, for each data processing task, an array, vector or other arrangement of input data transfer times. In some embodiments, the arrangement can include transfer times for each input data from the input data's original location to each data processing location having available resources.

In some embodiments, the processor(s) identify data processing locations having available resources as described herein or otherwise.

In some instances, input data for a task may be located at multiple locations in the distributed computing environment. In some embodiments, the processors determine the input data transfer times to transfer each of the respective input data to each data processing location.

In some embodiments, determining an input data transfer time includes identifying a size and location of each input data for a task. In some embodiments, this data may be obtained from a job manager or other DRM component. In some embodiments, input data size and location information can be included in job data and/or task data which may be received when tasks are added to the scheduling pool or at any other time.

In some embodiments, the processor(s) may obtain input data size and location information from one or more file system processes.

In some embodiments, determining an input data transfer time includes determining a communication bandwidth between each input data location and each of the data processing locations. In some embodiments, the processors determine communication bandwidths through measurements using the iperf2 or other similar utility. In some embodiments, the processors may determine communication bandwidths by monitoring data transfer times of previous data transmissions between the respective input data locations and data processing locations.

In some embodiments, the input data transfer time to transfer all input data for a particular task to a particular data processing location is determined to be the largest transfer time selected from the corresponding transfer times for each input data.

In some embodiments, the processors determine the input data transfer times based on the following equation:

$$c_{i,j}^k = \begin{cases} 0, & \text{when } S_i^k = \{j\} \\ \max_{s \in S_i^k, s \neq j} (d_i^{k,s}/b_{sj}), & \text{otherwise} \end{cases}$$

Where $c_{i,j}^k$ is the input data transfer time for task i of job k at data processing location j; s is a input data source location from the set S of all input data source location for the particular task i of the particular job k; d is the amount of data to be transferred; and b is the communication bandwidth from location s to location j. In some embodiments, the data transfer time is zero when input data is already at the data processing location.

At 630, the processor(s) determine a task completion time for each data processing task for each data processing location. In some embodiments, the task completion time is determined based on the corresponding input data transfer times.

In some embodiments, the task completion time can be based on the time required for each task to be executed. In some embodiments, the task completion time is based on a sum of the data transfer time and the execution time for a particular data processing location.

In some embodiments, the processor(s) determine an execution time for each data processing task. In some embodiments, the execution time can be determined based on the type of task and/or the commands/processes invoked by the task. For example, in some embodiments, the type of task may be matched with a database of execution data for types of data processing tasks. In some embodiments, the database may include historical or defined task execution times, common numbers of computations performed by a task (e.g. number of floating point operations, number of floating point operations per input data unit, etc.) and the like. In some embodiments, the processor(s) determine the execution time for a task based on the size of the input data for the task.

In some embodiments, the processors determine an execution time for a task at each data processing location. In some embodiments, the execution time for a task is based on the capabilities of the available resources at the data processing locations (e.g. processor speed, number of processing cores, floating point operations per second, etc.).

Beginning at 640, the processors iteratively assign tasks to available resources until all tasks identified in the set of task identifiers have been assigned. At 640, the processors select a job having unscheduled tasks and having the longest optimal job completion time based on the task completion times and the data processing locations having available resources. In some embodiments, the processors select the job with unscheduled tasks having the longest job completion time based on the shortest task completion times for the job.

In some embodiments, the completion time $\tau_k$ of job k can be identified as the largest job completion time among all of its tasks and across all available data processing locations D:

$$\tau_k = \max_{i \in \tau_k, j \in D} x_{i,j}^k (c_{i,j}^k + e_{i,j}^k)$$

Where $x_{i,j}^k$ is a binary variable indicating whether the i-th task of job k is assigned to data location j; and where $e_{i,j}^k$ is the execution time for the i-th task of job k at data location j. In embodiments where the execution time is not considered, the $e_{i,j}^k$ term can be omitted.

In some embodiments, the processors select the job corresponding to the largest value from the set of shortest completion times for all the jobs $\{\tau_1, \tau_2, \ldots, \tau_K\}$. In some embodiments, to select the job corresponding to the largest value from the set of shortest completion times for the jobs, the processors calculate the shortest completion times for each job based on the task completion times and the data processing locations having available resources, and select the job which corresponds to the largest optimal completion time.

At 650, the processors select the unscheduled task(s) having the longest optimal completion time from the tasks of the selected job. In some embodiments, when more than one task has the same optimal completion time or must be assigned in a particular location in order to achieve the optimal completion time, the processors select all of these tasks. In some embodiments, the processors select the task having the longest task completion time based on the shortest task completion times for the unscheduled tasks included in the selected job.

At 660, the processors schedule the selected data processing task(s) for execution at the data processing location corresponding to their shortest completion times. In some embodiments, scheduling tasks includes assigning the task to the data processing location. In some embodiments, this includes updating a set of x values, such that the x value corresponding to the selected task at the corresponding data processing location is set to 1, true, or a functionally equivalent value; and the x values corresponding to the selected task at other data processing locations are set to 0, false or a functionally equivalent value.

At 670, the processors update the available processing resources to identify the resources to be consumed by the scheduled task as unavailable. In some embodiments, the processors may represent available resources at each data processing location as an array of values or other suitable dataset. In some embodiments, the values may be binary to represent a slot or position which may or may not accommodate a task. In some embodiments, the values may represent available or unavailable amounts of a resource (e.g. available memory). In some such embodiments, these values are updated to reflect the resources that will be consumed by the assigned task.

While each task has not yet been scheduled 680, the processors repeat the process starting at 640.

At 690, when each task has been scheduled, the processors generate and/or transmit instructions or other signals to execute the scheduled tasks. In some embodiments, the processors provide the scheduled task's data location assignment to another DRM component for execution. In other embodiments, the processors may generate instructions and/or datasets to instruct the data processing locations to execute their assigned tasks.

In some embodiments, rather than waiting for all tasks to be scheduled, the processors can initiate the execution of tasks as they are scheduled.

Because the slowest task for a particular job will define the optimal completion time, it does not matter how much faster other tasks in the job are completed. Therefore, in some embodiments, in order to prevent unnecessary optimization of faster tasks in a job, after determining a task assignment, the processors are can update objective parameters for all unassigned tasks belonging to the same job. This is illustrated in FIGS. 7 and 8.

In some embodiments, after determining the resource/location assignment for the selected task, the processor(s) adjust the completion times of all other unscheduled data processing tasks included in the selected job. In some embodiments, the completion times of all other unscheduled data processing tasks in the selected job are set to have an optimal completion time which is not faster than the completion time of the selected data processing task. In some embodiments, if the optimal completion time of the unscheduled data processing task in the selected job is faster than the completion time of the selected data processing task, the completion time of the unscheduled data processing task is set to the completion time of the selected data processing task.

In some embodiments, the completion time of an unscheduled data processing task in the selected job is set to the maximum between its own completion time and the completion time of the selected data processing task.

Figure 7:
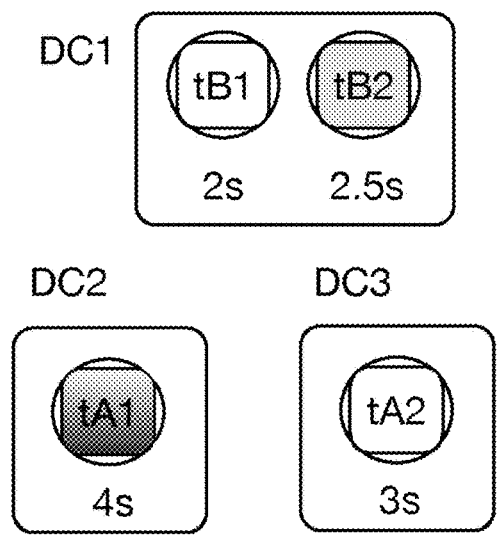
FIGS. 7 and 8 are diagrams showing two different example task assignments for a computing environment having three data processing locations.
Figure 8:
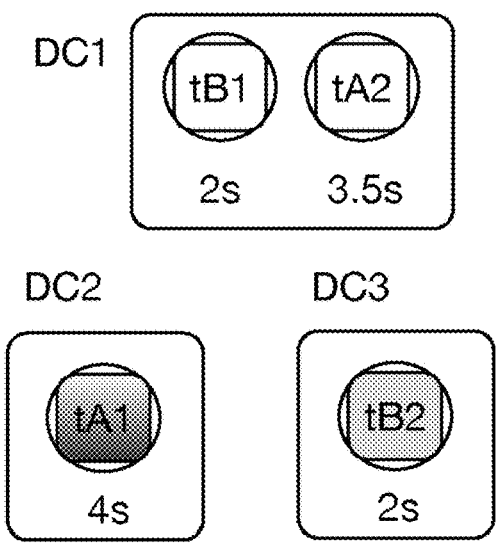

FIGS. 7 and 8 show two example task assignments for two jobs each having two tasks in a computing environment 700 with three data processing locations: datacenter DC1, datacenter DC2 and datacenter DC3. DC1 can accommodate two tasks based on its available resource data, and DC2 and DC3 can accommodate one task each.

In this example, after the calculation in the first round, task tA1 is assigned to resources in DC2, which has a completion time of four seconds at this location. This assignment is selected because assigning task tA1 to DC2 achieves the worst optimal completion time amongst the jobs. In FIG. 7, the completion times for task tA2 are not updated, so in the second round, the process would maximize the next worst completion time for task tA2 which is in the same job. This results in the completion times (in seconds) for the tasks as tA1=4, tA2=3, tB1=2, and tB2=2.5. Job A has a completion time of 4 seconds, and Job B has a completion time of 2.5 seconds.

In contrast, in FIG. 8, after the processors determine tA1 is to be assigned to DC2, the completion time for tA2 is updated to be 4 seconds. This results in the task assignment shown in FIG. 8 and the completion times of tA1=4, tA2=3.5, tB1=2, and tB2=2. Job A still has a completion time of 4 seconds, and Job B has a completion time of 2 seconds. In some embodiments, the selection in a subsequent round is solved over a decreased set of variables with updated constraints and objectives such that, in some instances, a next worst job completion time can be optimized without impacting the worst job performance in the current round.

In some instances, task assignment problems can be defined as integer optimization problems which are generally considered to be NP-hard problems. In some situations, based on a number of transformations, the problem can be solved as an equivalent problem with a separable convex objective. In some examples, this may allow the task assignment to be performed more effectively by the DRM system.

Based on the terminology above, in some situations, determining the optimal worst performance across jobs may be represented by a lexicographical minimization problem f:

$$\operatorname*{lexmin}_{x} f = (\tau_1, \tau_2, \ldots, \tau_K)$$

$$\text{s.t.} \quad \tau_k = \max_{i \in \tau_k, j \in D} x_{i,j}^k (c_{i,j}^k + e_{i,j}^k), \forall k \in K$$

With the constraints that the total number of tasks to be assigned to a data processing location j does not exceed its resource capacity $a_j$:

$$\sum_{k \in K} \sum_{i \in \tau_k} x_{i,j}^k \leq a_j, \forall j \in D$$

Each task is only assigned to a single data processing location:

$$\sum_{j \in D} x_{i,j}^k = 1, \forall\, i \in \tau_k, \forall\, k \in K$$

Where each task assignment is represented by a binary variable x:

$x_{i,j}^k \in \{0,1\}$, $\forall i \in \tau_k$, $\forall j \in D$, $\forall k \in K$.

The objective of this problem is a vector f with K elements, each representing the optimal completion time for a particular job.

Based on the above equations and constraints, a potentially NP-hard, integer programming problem can be defined as:

$$\min_{x} \max_{k \in K} \left( \max_{i \in \tau_k, j \in D} x_{i,j}^k (c_{i,j}^k + e_{i,j}^k) \right)$$

In some embodiments, to impart fairness across jobs, the job having the slowest optimal completion time can be assigned first, and in subsequent iterations, the job having the next slowest optimal completion time can be scheduled.

An optimal solution for the job having the slowest optimal completion time may be obtained by solving the following linear programming problem:

$$\min_{x,\lambda} \sum_{k \in K} \sum_{i \in \tau_k} \sum_{j \in D} \left( \lambda_{i,j}^{k,0} + M^{c_{i,j}^k + e_{i,j}^k} \lambda_{i,j}^{k,1} \right)$$

s.t. $x_{i,j}^k = \lambda_{i,j}^{k,1}$, $\forall\, k \in K$, $\forall\, i \in \tau_k$, $\forall\, j \in D$ $\lambda_{i,j}^{k,0} + \lambda_{i,j}^{k,1} = 1$, $\forall\, k \in K$, $\forall\, i \in \tau_k$, $\forall\, j \in D$ $\lambda_{i,j}^{k,0}, \lambda_{i,j}^{k,1}, x_{i,j}^k \in \mathbb{R}^+$, $\forall\, k \in K$, $\forall\, i \in \tau_k$, $\forall\, j \in D$ Where M is the dimension of $g = (\phi(x_{1,1}^1), \ldots, \phi(x_{i,j}^k), \ldots \phi(x_{n_K,j}^K))$, and $\phi(x_{i,j}^k)$ is the convex objective function.

$\phi(x_{i,j}^k) = x_{i,j}^k (c_{i,j}^k + e_{i,j}^k)$, $\forall i \in \tau_k$, $\forall j \in D$, $\forall k \in K$.

In some embodiments, the processors are configured to populate one or more data structures representing parameters for solving some or all aspects of the above-noted linear programming model. In some embodiments, the data structures by matrices, vectors, or any other suitable data format.

In some embodiments, the data structures encapsulate task assignment parameters (e.g. x), available resources (e.g. a), input data transfer times (e.g. c), execution times (e.g. e), job completion times and/or task completion times.

In some embodiments, the processors executed one or more linear programming processes on the populated data structures to identify optimal completion times and/or task assignments. In some embodiments, the linear programming processes may be implemented with MOSEK™ or other linear programming solver packages.

After solving the linear programming minimization subproblem above, the processors continue to solve the lexicographical minimization problem f by iteratively minimizing the next worst completion time.

In some embodiments, the processors populate and manipulate data structures representing data processing tasks, jobs, data processing location assignment parameters (e.g. x), available resources, and/or completion times. In some embodiments, the data structures in conjunction with the linear programming solver encapsulate the completion time objectives and constraints described or similarly represented herein.

After solving the initial subproblem, it is known that the optimal worst job completion time is achieved by job k*, whose slowest task i* is assigned to processing location j*. In some embodiments, the processor(s) assign the slowest task and update the data processing location assignment parameters to remove the assignment parameter $x_{i^*,j^*}^{k^*}$ from the data structures for the next iteration. Also, because task i* is to be assigned to data location j*, the processor(s) update the data structures to set all other assignment parameters to 0 or false ($x_{i^*,j}^{k^*}=0$, $\forall j \neq j^*$). The corresponding available resource parameters are also updated in the data structures.

In some embodiments, in order to obtain an assignment which can prevent an earlier selected job from receiving task assignments which could be unnecessarily detrimental to other jobs (as illustrated in the examples in FIGS. 7 and 8), the processors are configured to update the data structures to change the completion times. In some embodiments, after the slowest task i* of job k* has been assigned, for the tasks in k* which have not yet been assigned ($x_{i,j}^{k^*}$, $\forall i \neq i^*$, $\forall j \neq j^*$), the processors update their completion times as $x_{i,j}^{k^*}(c_{i^*,j^*}^{k^*} + e_{i^*,j^*}^{k^*})$.

Figure 9:
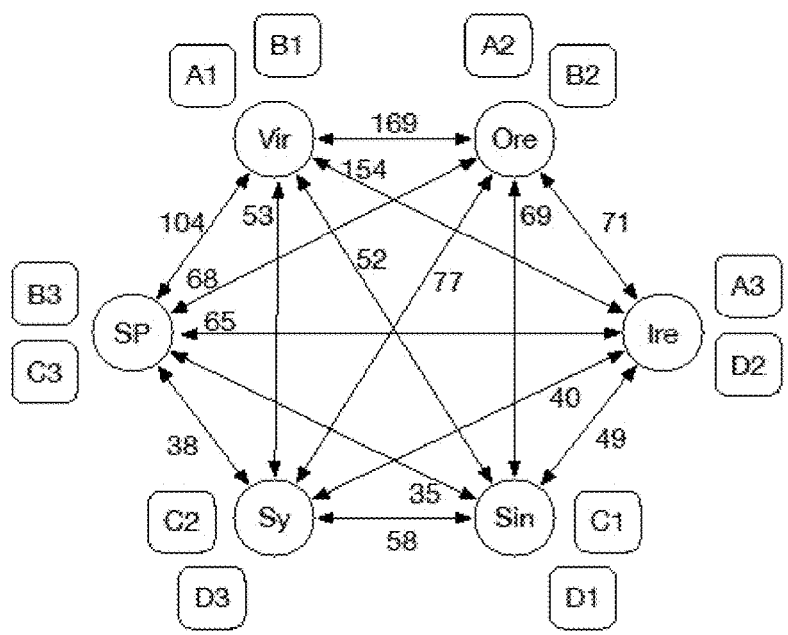
FIG. 9 is a diagram showing an example geodistributed data processing environment.

FIG. 9 shows an example data processing environment 900 having six geodistributed data processing locations (datacenters: Vir, Ore, Ire, Sin, Sy, and SP) with the arrows indicating the available bandwidth between each datacenter. Each datacenter has resources for two task assignments each, and the input data for jobs A, B, C and D are illustrated beside the datacenter at which they are location.

Figure 10:
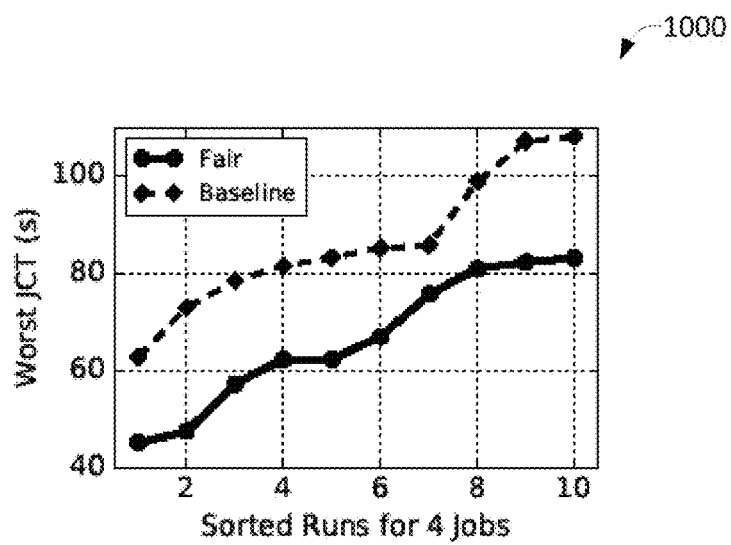
FIGS. 10, 11 and 12 include graphs showing example job completion time results.
Figure 10:
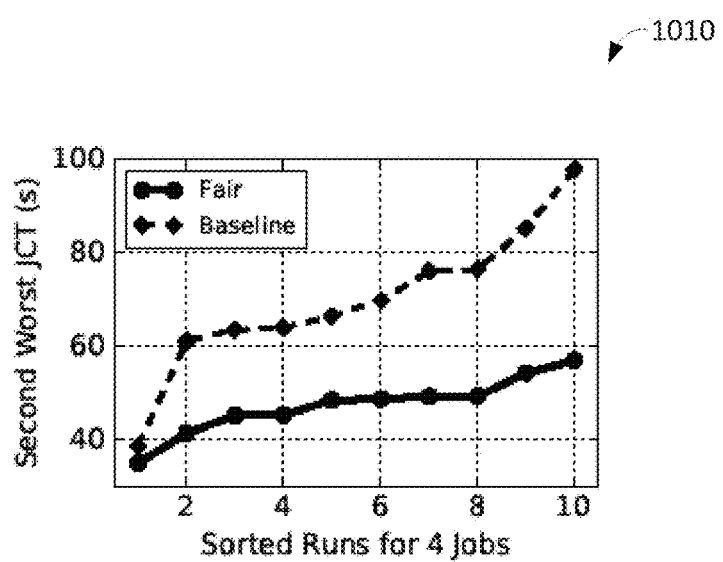

In an example test scenario, 4 jobs A, B, C and D are to be scheduled, each having three tasks each. The example data processing environment obtained the worst and second worst job completion times illustrated in FIG. 10. The upper graph 1000 shows, for ten separate runs, the worst job completion times of the four jobs. The dotted line (Baseline) represents the worst job completion times when the system is implemented using a default scheduling process in Spark™. In contrast, the solid line (Fair) represents the corresponding worst job completion times when the system is implemented using a scheduling process as described herein.

The lower graph 1010 similarly shows the job completion times for the second slowest job. In every run, the slowest and the second slowest jobs both completed faster when the "Fair" system than when using the "Baseline" system.

Figure 11:
Figure 11:
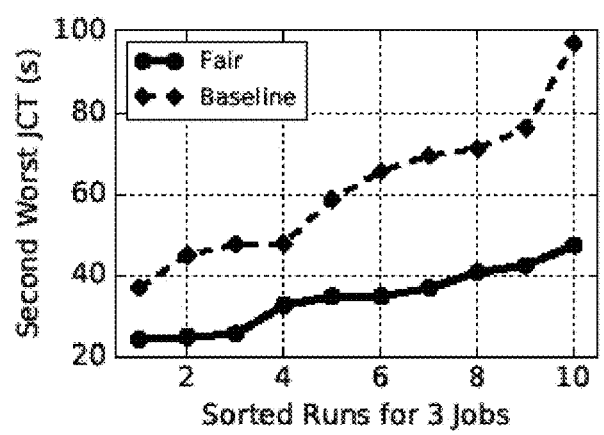

FIG. 11 similarly shows the results for the worst job completion time 1100, and the second worst job completion time 1110 for a scenario when three jobs are received for execution on the example data processing environment 900.

Figure 12:
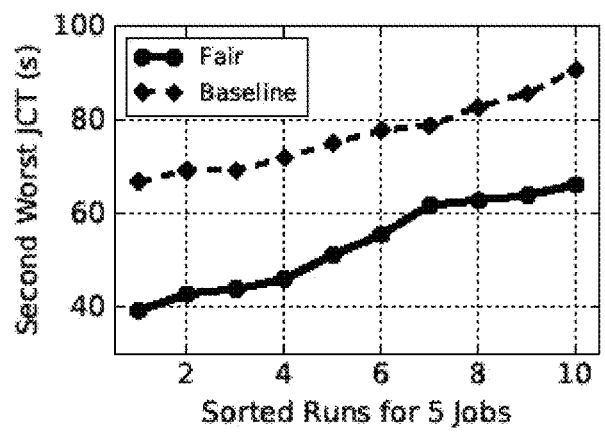
Figure 12:
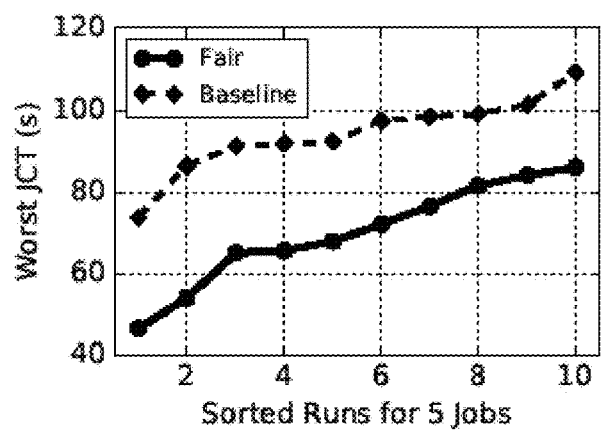

FIG. 12 similarly shows the results for the worst job completion time 1200, and the second worst job completion time 1210 for a scenario when five jobs are received for execution on the example data processing environment 900.

Embodiments disclosed herein may be implemented using hardware, software or some combination thereof. Based on such understandings, the technical solution may be embodied in the form of a software product. The software product may be stored in a non-volatile or non-transitory storage medium, which can be, for example, a compact disk read-only memory (CD-ROM), USB flash disk, a removable hard disk, flash memory, hard drive, or the like. The software product includes a number of instructions that enable a computing device (computer, server, mainframe, or network device) to execute the methods provided herein.

Program code may be applied to input data to perform the functions described herein and to generate output information. The output information is applied to one or more output devices. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and/or combination thereof.

Each computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

The present disclosure may make numerous references to servers, services, interfaces, portals, platforms, or other systems formed from hardware devices. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

Various example embodiments are described herein. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory(ies), displays, networks particularly configured to implement various acts. The embodiments described herein are directed to electronic machines adapted for processing and transforming electromagnetic signals which represent various types of information. The embodiments described herein pervasively and integrally relate to machines and their uses; the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for scheduling jobs in a distributed computing environment, the method comprising:
   obtaining a set of task identifiers, each task identifier identifying a corresponding data processing task included in one of a plurality of jobs to be scheduled for execution;
   for each unscheduled data processing task,
      determining input data transfer times to transfer input data for the unscheduled data processing task to each of a plurality of data processing locations; and
      for each of the plurality of data processing locations, determining a task completion time for the unscheduled data processing task based on the corresponding input data transfer time;
   from the jobs having unscheduled data processing tasks, selecting a job having a longest job completion time based on a shortest task completion time for the data processing tasks included in the selected job;
   selecting, from the unscheduled data processing tasks for the selected job, a data processing task having a longest task completion time based on the shortest task completion times for the unscheduled data processing tasks for the selected job; and scheduling the selected data processing task for execution at the data processing location corresponding to the selected data processing task's shortest completion time and having available processing resources.

2. The method of claim 1, comprising: adjusting the completion times of all other unscheduled data processing tasks included in the selected job to have a completion time equal to the maximum of: the optimal completion time of the selected data processing task, and the completion time of the respective unscheduled data processing task.

3. The method of claim 1, comprising: until each data processing task identified in the set of task identifiers has been scheduled, repeating: updating the available processing resources to identify the resources to be consumed by the previously scheduled data processing task as unavailable; selecting the job of the set of jobs having unscheduled tasks and having the longest job completion time based on the shortest task completion time for the data processing tasks included in the selected job; selecting, from the unscheduled tasks for the selected job, the data processing task having the longest task completion time based on shortest task completion times for the unscheduled data processing tasks for the selected job; and scheduling the selected data processing task at the data processing location corresponding to the selected data processing task's shortest completion time.

4. The method of claim 1, wherein determining the input data transfer times for a single data processing task identified in the set of task identifiers comprises:

identifying a size and location of each input data for the single data processing task;

determining a communication bandwidth between each input data location and each of the data processing locations; and for each of the data processing locations:

determining the transfer time for each of the input data to the data processing location based on the size of the input data and the communication input data location and the data processing location; and selecting, from the transfer times for each of the input data to the data processing location, a largest transfer time as the input data transfer time for the single data processing task at the data processing location.

5. The method of claim 1, comprising: for each of the data processing tasks identified in the set of task identifiers, determining an execution time for the data processing task; and for each of the plurality of data processing locations having available processing resources, determining the completion time for the data processing task at the data processing location based on the corresponding input data transfer time and the corresponding execution time.

6. The method of claim 5, wherein identifying the execution time for the data processing task comprises:

identifying a type of the data processing task;

based on a database of execution data for types of data processing tasks, determining the execution time for the data processing task based on the identified type, and a size of the input data for the data processing task.

7. The method of claim 1, comprising:

populating one or more data structures representing completion time objectives and constraints based on the completion times for each of the data processing tasks, data processing location assignments parameters, and the available resources;

wherein selecting the job having the longest optimal completion time includes solving a linear programming problem defined by the matrices.

8. The method of claim 1, wherein obtaining the set of task identifiers comprises:

receiving job execution requests until a scheduling trigger is detected; and upon detection of the scheduling trigger, identifying the set of data processing tasks to be scheduled from the job execution requests.

9. The method of claim 8, wherein the scheduling trigger is detected when a defined time period has elapsed, or when a number of received jobs execution requests meets a defined threshold.

10. The method of claim 1, wherein the data processing tasks identified in the set of task identifiers can be executed in parallel.

11. The method of claim 1, wherein selecting the job having the longest job completion time is based on the shortest task completion times at data processing locations having available resources; and wherein selecting the data processing task having the longest task completion time is based on the shortest task completion times for the unscheduled data processing tasks for the selected job at data processing locations having available resources.

12. A system comprising:

at least one processor for scheduling jobs in a distributed computing environment, the at least one processor configured for:

obtaining a set of task identifiers, each task identifier identifying a corresponding data processing task included in one of a plurality of jobs to be scheduled for execution at one of a plurality of data processing locations;

from the jobs having unscheduled data processing tasks, selecting a job having a longest job completion time based on a shortest task completion time for the data processing tasks included in the selected job;

selecting, from unscheduled data processing tasks for the selected job, a data processing task having a longest task completion time based on shortest task completion times for the unscheduled data processing tasks for the selected job; and scheduling the selected data processing task for execution at the data processing location of the plurality of data processing locations corresponding to the selected data processing task's shortest completion time and having available processing resources.

13. The system of claim 12, wherein the at least one processor is configured for: adjusting the completion times of all other unscheduled data processing tasks included in the selected job to have a completion time equal to the maximum of: the optimal completion time of the selected data processing task, and the completion time of the respective unscheduled data processing task.

14. The system of claim 12, wherein the at least one processor is configured for:

until each data processing task identified in the set of task identifiers has been scheduled, repeating: updating the available processing resources to identify the resources to be consumed by the previously scheduled data processing task as unavailable; selecting the job of the set of jobs having unscheduled tasks and having the longest job completion time based on the shortest task completion time for the data processing tasks included in the selected job; selecting, from the unscheduled tasks for the selected job, the data processing task having the longest task completion time based on shortest task completion times for the unscheduled data processing tasks for the selected job; and scheduling the selected data processing task at the data processing location corresponding to the selected data processing task's shortest completion time.

15. The system of claim 12, wherein the at least one processor is configured for:
for each data processing task identified in the set of task identifiers,
determining input data transfer times to transfer input data for the data processing task to each of the plurality of data processing locations having available processing resources; and
for each of the plurality of data processing locations having available processing resources, determining a completion time for the data processing task based on the corresponding input data transfer time.

16. The system of claim 15, wherein determining the input data transfer times for a single data processing task identified in the set of task identifiers comprises:
identifying a size and location of each input data for the single data processing task;
determining a communication bandwidth between each input data location and each of the data processing locations; and
for each of the data processing locations:
determining the transfer time for each of the input data to the data processing location based on the size of the input data and the communication input data location and the data processing location; and
selecting, from the transfer times for each of the input data to the data processing location, a largest transfer time as the input data transfer time for the single data processing task at the data processing location.

17. The system of claim 12, wherein the at least one processor is configured for:
for each of the data processing tasks identified in the set of task identifiers,
determining an execution time for the data processing task; and
for each of the plurality of data processing locations having available processing resources, determining the completion time for the data processing task at the data processing location based on a corresponding input data transfer time and the corresponding execution time.

18. The system of claim 17, wherein identifying the execution time for the data processing task comprises:
identifying a type of the data processing task;
based on a database of execution data for types of data processing tasks, determining the execution time for the data processing task based on the identified type, and a size of the input data for the data processing task.

19. The system of claim 12, wherein the at least one processor is configured for:
populating one or more data structures representing completion time objectives and constraints based on the completion times for each of the data processing tasks, data processing location assignments parameters, and the available resources;
wherein selecting the job having the longest optimal completion time includes solving a linear programming problem defined by the matrices.

20. The system of claim 12, wherein obtaining the set of task identifiers comprises:
receiving job execution requests until a scheduling trigger is detected; and
upon detection of the scheduling trigger, identifying the set of data processing tasks to be scheduled from the job execution requests.

21. The system of claim 20, wherein the scheduling trigger is detected when a defined time period has elapsed, or when a number of received jobs execution requests meets a defined threshold.

22. The system of claim 12, wherein the data processing tasks identified in the set of task identifiers can be executed in parallel.

23. The system of claim 12, wherein selecting the job having the longest job completion time is based on the shortest task completion times at data processing locations having available resources; and
wherein selecting the data processing task having the longest task completion time is based on the shortest task completion times for the unscheduled data processing tasks for the selected job at data processing locations having available resources.

24. A non-transitory, computer-readable medium or media having stored thereon computer-readable instructions which when executed by at least one processor configure the at least one processor for:
obtaining a set of task identifiers, each task identifier identifying a corresponding data processing task included in one of a plurality of jobs to be scheduled for execution at one of a plurality of data processing locations;
from the jobs having unscheduled data processing tasks, selecting a job having a longest job completion time based on a shortest task completion time for the data processing tasks included in the selected job;
selecting, from unscheduled data processing tasks for the selected job, a data processing task having a longest task completion time based on shortest task completion times for the unscheduled data processing tasks for the selected job; and
scheduling the selected data processing task for execution at the data processing location of the plurality of data processing locations corresponding to the selected data processing task's shortest completion time and having available processing resources.

25. The medium or media of claim 24, wherein the computer-readable instructions configure the at least one processor for: adjusting the completion times of all other unscheduled data processing tasks included in the selected job to have a completion time equal to the maximum of: the optimal completion time of the selected data processing task, and the completion time of the respective unscheduled data processing task.

26. The medium or media of claim 24, wherein the computer-readable instructions configure the at least one processor for:
until each data processing task identified in the set of task identifiers has been scheduled, repeating: updating the available processing resources to identify the resources to be consumed by the previously scheduled data processing task as unavailable; selecting the job of the set of jobs having unscheduled tasks and having the longest job completion time based on the shortest task completion time for the data processing tasks included in the selected job; selecting, from the unscheduled tasks for the selected job, the data processing task having the longest task completion time based on shortest task completion times for the unscheduled data processing tasks for the selected job; and scheduling the selected data processing task at the data processing location corresponding to the selected data processing task's shortest completion time.

27. The medium or media of claim 24, wherein the computer-readable instructions configure the at least one processor for:

for each data processing task identified in the set of task identifiers,
determining input data transfer times to transfer input data for the data processing task to each of the plurality of data processing locations having available processing resources; and
for each of the plurality of data processing locations having available processing resources, determining a completion time for the data processing task based on the corresponding input data transfer time.

* * * * *